United States Patent
Mameda et al.

(10) Patent No.: US 11,940,364 B2
(45) Date of Patent: Mar. 26, 2024

(54) VISCOSITY MEASURING SYSTEM

(71) Applicant: HONDA MOTOR CO., LTD., Tokyo (JP)

(72) Inventors: Kazutoshi Mameda, Tokyo (JP); Shinsuke Chokyu, Tokyo (JP); Nobuyoshi Muromoto, Tokyo (JP); Kotaro Tadokoro, Tokyo (JP); Keiichi Shiraishi, Tokyo (JP); Tsuyoshi Kokusho, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 129 days.

(21) Appl. No.: 17/668,041

(22) Filed: Feb. 9, 2022

(65) Prior Publication Data

US 2022/0283069 A1   Sep. 8, 2022

(30) Foreign Application Priority Data

Mar. 8, 2021  (JP) ................................. 2021-036347

(51) Int. Cl.
 *G01N 11/08*  (2006.01)
 *G01N 11/00*  (2006.01)
 *G01N 11/14*  (2006.01)

(52) U.S. Cl.
 CPC ............ *G01N 11/08* (2013.01); *G01N 11/14* (2013.01); *G01N 2011/002* (2013.01)

(58) Field of Classification Search
 CPC ........ G01N 11/08; G01N 11/04; G01N 11/06; G01N 11/02; G01N 2011/0046
 USPC ............................................ 73/54.01–54.43
 See application file for complete search history.

(56) References Cited

U.S. PATENT DOCUMENTS

| | | | | |
|---|---|---|---|---|
| 7,644,632 B2 * | 1/2010 | Best | ....................... | G01N 11/02 73/861.01 |
| 8,211,571 B2 * | 7/2012 | Takei | .................... | H01M 4/623 241/30 |
| 8,550,580 B2 * | 10/2013 | Shimoda | ................. | B41J 2/195 347/7 |

(Continued)

FOREIGN PATENT DOCUMENTS

| JP | H60-100739 A | 6/1985 |
|---|---|---|
| JP | H02-057945 A | 2/1990 |

(Continued)

OTHER PUBLICATIONS

Espacenet Machine Translation of JP-H-0257945 A Originally Published On Feb. 27, 1990. (Year: 1990).*

(Continued)

*Primary Examiner* — David A. Rogers
(74) *Attorney, Agent, or Firm* — Carrier, Shende & Associates P.C.; Joseph P. Carrier; Jeffrey T. Gedeon

(57) ABSTRACT

A viscosity measuring system is equipped with a tank, a flow pathway, an external force applying unit, and a pump. The viscosity measuring system further comprises a first pressure detection unit which detects a pressure of the electrode ink, and a second pressure detection unit which detects the pressure of the electrode ink on a more downstream side than the first pressure detection unit. A detection processing unit calculates a viscosity of the electrode ink based on the pressure detected by the first pressure detection unit and the pressure detected by the second pressure detection unit.

4 Claims, 8 Drawing Sheets

(56) References Cited

U.S. PATENT DOCUMENTS

| | | | |
|---|---|---|---|
| 8,657,394 B2* | 2/2014 | Katoh | B41J 2/17556 |
| | | | 347/85 |
| 9,010,670 B2* | 4/2015 | Andre | B01F 29/61 |
| | | | 241/228 |
| 9,233,537 B2* | 1/2016 | Hayashi | B41J 2/1626 |
| 9,450,231 B2* | 9/2016 | Madray | H01M 4/1397 |
| 9,698,417 B2* | 7/2017 | Buannic | C01G 33/00 |
| 9,799,894 B2* | 10/2017 | Yamaguchi | H01M 4/928 |
| 10,532,491 B2* | 1/2020 | Takekuma | B29B 7/483 |
| 11,435,274 B2* | 9/2022 | Hitchcock | G01N 33/2823 |
| 2018/0190998 A1 | 7/2018 | Maeda et al. | |
| 2019/0020040 A1 | 1/2019 | Kato et al. | |

FOREIGN PATENT DOCUMENTS

| | | | | |
|---|---|---|---|---|
| JP | 2000-353515 A | 12/2000 | | |
| JP | 2018041616 A * | 3/2018 | | |
| JP | 2019-216060 A | 12/2019 | | |
| JP | 2012-142151 A | 7/2021 | | |
| WO | WO-2004001391 A1 * | 12/2003 | | B41J 2/195 |
| WO | 2016098446 A1 | 6/2016 | | |
| WO | 2017/130694 A1 | 8/2017 | | |

OTHER PUBLICATIONS

Espacenet Machine Translation of JP 2012142151 A Originally Published On Jul. 26, 2012. (Year: 2012).*
Espacenet Machine Translation of JP 2018041616 A Originally Published On Mar. 15, 2018. (Year: 2018).*
Espacenet Machine Translation of WO 2004/001391 A1 Originally Published On Dec. 31, 2003. (Year: 2003).*
Office Action dated Oct. 25, 2022 issued over the corresponding Japanese Patent Application No. 2021-036347 with the English translation thereof.

* cited by examiner

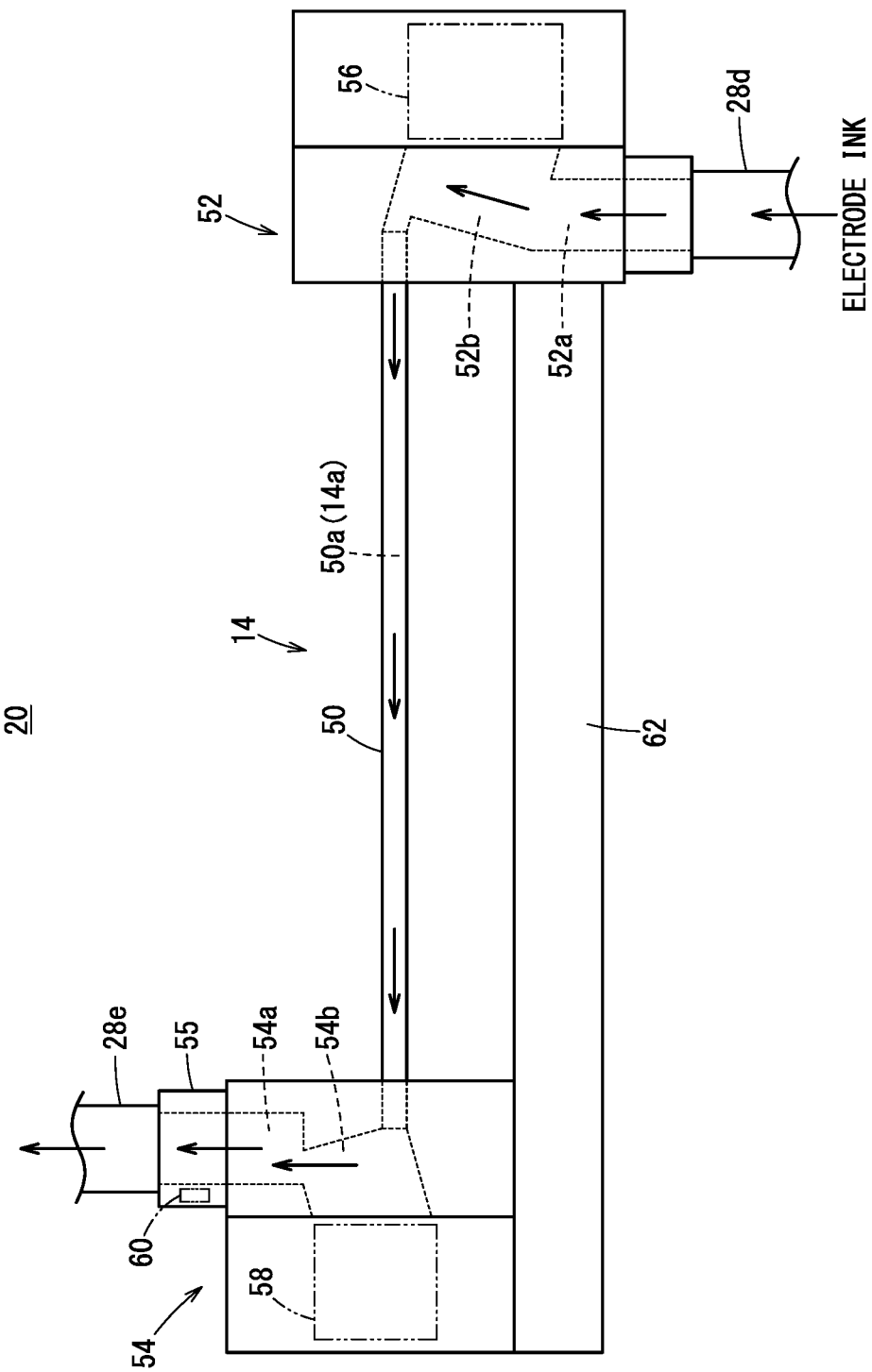

VISCOSITY MEASURING SYSTEM

CROSS-REFERENCE TO RELATED APPLICATIONS

This application is based upon and claims the benefit of priority from Japanese Patent Application No. 2021-036347 filed on Mar. 8, 2021, the contents of which are incorporated herein by reference.

BACKGROUND OF THE INVENTION

Field of the Invention

The present invention relates to a viscosity measuring system and a viscosity measuring method for measuring the viscosity of an electrode ink.

Description of the Related Art

Electrodes (an anode electrode and a cathode electrode) that constitute a fuel cell are constituted by laminating a catalyst layer and a gas diffusion layer. The catalyst layer is manufactured by coating a substrate material with an electrode ink (catalyst ink). The viscosity of the electrode ink affects the yield and the like during manufacturing. Therefore, when manufacturing the electrodes, it is important to recognize the viscosity of the electrode ink. For example, as disclosed in WO 2016/098446 A1, the viscoelasticity of a conductive ink printed on separators of a fuel cell is measured using a rotary rheometer.

SUMMARY OF THE INVENTION

However, the viscosity of the electrode ink also changes due to external forces when the electrode ink is flowing at the time of manufacturing. Even if a small amount of the electrode ink is sampled, and the viscosity is measured using a rotary rheometer, it is not possible to grasp the state of the electrode ink that is flowing at the time of manufacturing. In particular, conventionally, the viscosity of the total amount of the electrode ink that is flowing at the time of manufacturing has been unknown.

The present invention has the object of solving the aforementioned problem.

A viscosity measuring system according to a first embodiment of the present invention comprises a tank configured to store an electrode ink, a flow pathway connected to the tank and in which the electrode ink is capable of flowing, an external force applying unit disposed in the flow pathway and configured to apply an external force to the electrode ink, a pump disposed in the flow pathway and configured to be capable of controlling a flow velocity or a flow rate of the electrode ink, a first pressure detection unit disposed in the flow pathway, and configured to detect a pressure of the electrode ink flowing through the flow pathway, a second pressure detection unit disposed in a portion in the flow pathway on a more downstream side than the first pressure detection unit, and configured to detect the pressure of the electrode ink flowing through the flow pathway, and a detection processing unit configured to calculate a viscosity of the electrode ink based on the pressure detected by the first pressure detection unit and the pressure detected by the second pressure detection unit.

A second aspect of the present invention is characterized by a viscosity measuring method for measuring a viscosity of an electrode ink, comprising the steps of storing the electrode ink in a tank, causing the electrode ink to flow through a flow pathway by a pump disposed in the flow pathway and which is connected to the tank, applying an external force to the electrode ink by an external force applying unit disposed in the flow pathway, detecting a pressure of the electrode ink flowing through the flow pathway by a first pressure detection unit disposed in the flow pathway, detecting the pressure of the electrode ink flowing through the flow pathway by a second pressure detection unit disposed in a portion in the flow pathway on a more downstream side than the first pressure detection unit, and calculating a viscosity of the electrode ink based on the pressure detected by the first pressure detection unit and the pressure detected by the second pressure detection unit.

According to the above-described viscosity measuring system and the viscosity measuring method, it is possible to measure the viscosity of the total amount of the electrode ink that is flowing.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a side view showing the structure of a state detection unit;

DESCRIPTION OF THE INVENTION

First Embodiment

Figure 1:
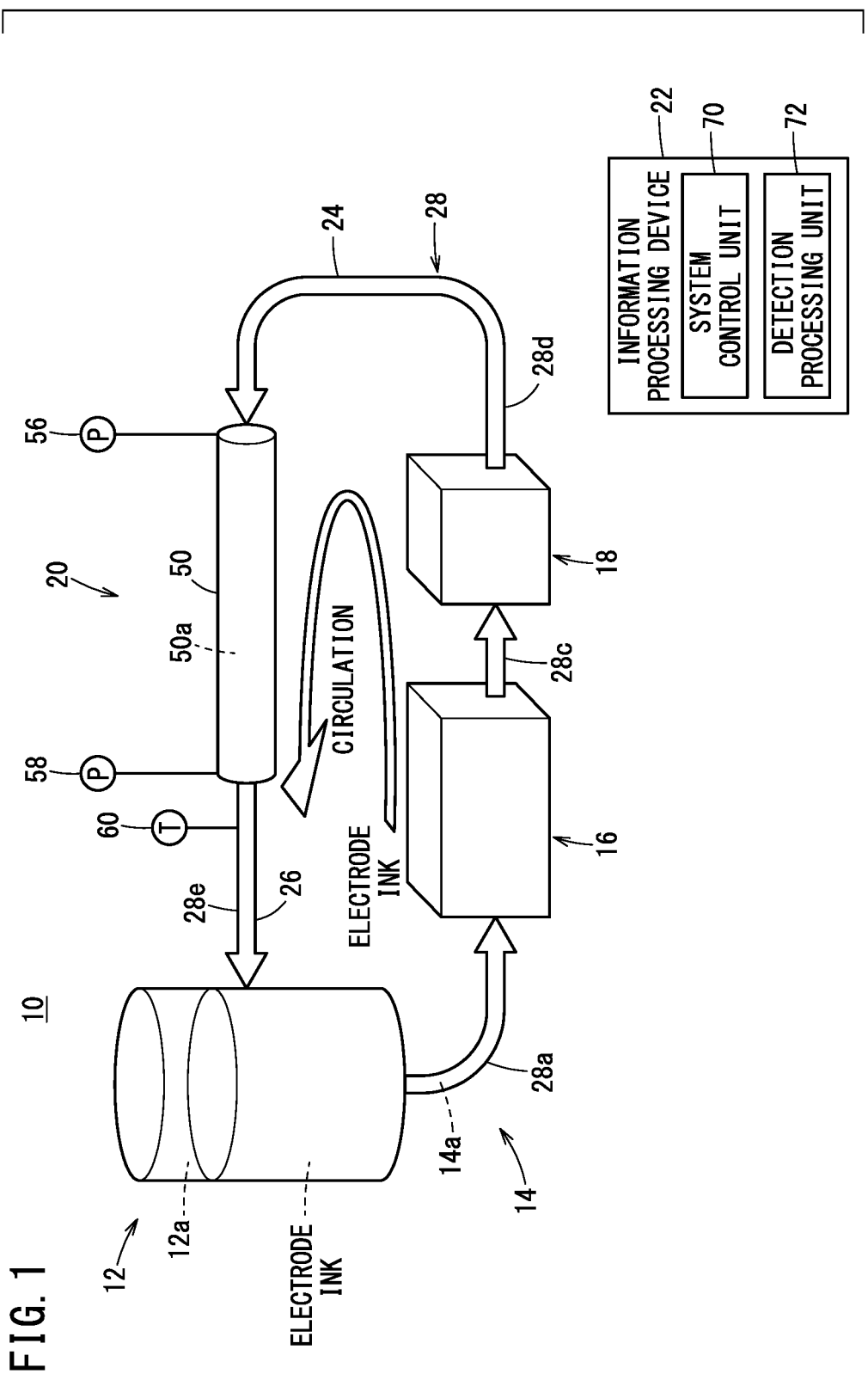
FIG. 1 is an explanatory diagram schematically showing an overall configuration of a viscosity measuring system according to a first embodiment of the present invention.

As shown in FIG. 1, a viscosity measuring system 10 according to a first embodiment of the present invention is configured in the form of an independent device, provided separately from an electrode manufacturing apparatus for manufacturing electrodes of the fuel cell. The viscosity measuring system 10 is offline with respect to the electrode manufacturing apparatus. The viscosity measuring system 10 includes a closed loop configuration provided independently of the electrode manufacturing apparatus. The viscosity measuring system 10 reproduces the external forces generated at the electrode manufacturing apparatus, and measures the viscosity of the electrode ink flowing inside the system, thereby simulating a state of the electrode ink when the electrode ink is actually applied to the electrode manufacturing apparatus.

The electrode ink, for example, is a catalyst ink for use in a fuel cell electrode. The catalyst ink for use in a fuel cell electrode includes, for example, a catalyst carrier on which the catalyst is carried, an ionomer that possesses proton conductivity, and a dispersive solvent that disperses the catalyst carrier and the ionomer. As the catalyst carrier, there can be applied conductive carbon (including carbon fibers) on which platinum (Pt) particles are supported or there can be applied ceramic. The ionomer is one in which a part of a hydrophobic main chain is replaced by a hydrophilic ionic group (a salt of carboxylic acid, sulfonic acid, or the like), to which there can be applied a fluorine-based electrolytic polymer such as a perfluorosulfonic acid polymer or a non-fluorine-based electrolytic polymer. The ionomer is an electrolytic polymer, or an electrolyte solution. Water or alcohol can be applied as the dispersive solvent.

In manufacturing the electrode ink, the catalyst carrier, the ionomer, and the dispersive solvent are mixed at an appropriate ratio, and a mixture of these components is obtained. For example, the mixture is crushed, kneaded, and stirred by a crushing mechanism such as a bead mill, a stirrer, or the like. Consequently, the electrode ink in which the catalyst carrier and the ionomer are dispersed in the dispersive solvent is prepared. The prepared electrode ink is provided in the form of a paste. Hereinafter, the manufacturing process for preparing this electrode ink is referred to as a kneading process.

Further, in manufacturing the electrodes of the fuel cell, during transportation of the substrate material, the electrode ink that was prepared by the kneading process is coated on the substrate material by a die head or the like so as to be formed with a constant thickness. Consequently, the catalyst layer for the electrode (the anode electrode or the cathode electrode) of the fuel cell is created. The substrate material, for example, is a polymer paste or an electrolyte membrane. Hereinafter, the manufacturing process for creating the catalyst layer will be referred to as a coating process.

The viscosity measuring system 10 simulates an apparatus that is used at a time of manufacturing the electrode ink, or at a time of manufacturing the fuel cell (when using the electrode ink). More specifically, the viscosity measuring system 10 is equipped with a tank 12 for storing the electrode ink, a flow pathway 14 connected to the tank 12, an external force applying unit 16 for applying an external force to the electrode ink, a pump 18 which is capable of controlling the flow velocity or the flow rate of the electrode ink, and a state detection unit 20 for detecting the state of the electrode ink flowing through the flow pathway 14. The flow pathway 14 allows the electrode ink to flow therethrough. The external force applying unit 16 and the pump 18 are disposed in the flow pathway 14. The viscosity measuring system 10 further includes an information processing device 22. The information processing device 22 controls operations of the external force applying unit 16 and the pump 18, and processes signals from the state detection unit 20.

The tank 12 is formed in a cylindrical shape having a storage space 12a in which the electrode ink is capable of being stored. An opening is provided at an upper end of the tank 12. The electrode ink is introduced into the storage space 12a from the opening. An electrode material of the electrode ink may be introduced into the tank 12 before or during preparation thereof. The electrode material, for example, is the catalyst carrier, the ionomer, or the dispersive solvent.

The flow pathway 14 forms a circulation circuit for allowing the electrode ink to circulate in a closed loop that includes the tank 12, the pump 18, the external force applying unit 16, and the state detection unit 20. Hereinafter, within the flow pathway 14, a route from the tank 12 to the state detection unit 20 is also referred to as a supply route 24. Within the flow pathway 14, a route from the state detection unit 20 to the tank 12 is also referred to as a return route 26. In the supply route 24, the external force applying unit 16, the pump 18, and the state detection unit 20 are provided sequentially in this order from the tank 12 toward a downstream side in a flow direction of the electrode ink. The return route 26 extends from the state detection unit 20, and is connected to the upper end of the tank 12. Moreover, the flow pathway 14 need not necessarily be equipped with the return route 26, and may be configured in a manner so as not to cause the electrode ink to be circulated.

The flow pathway 14 includes a flow path 14a inside of which the electrode ink is capable of flowing. The flow pathway 14 is constituted by a plurality of pipes 28 made from metal or resin. On an inner surface of the pipes 28 that constitute the flow path 14a, an appropriate coating is preferably applied in order to suppress the occurrence of electrical affects due to friction.

Figure 7:
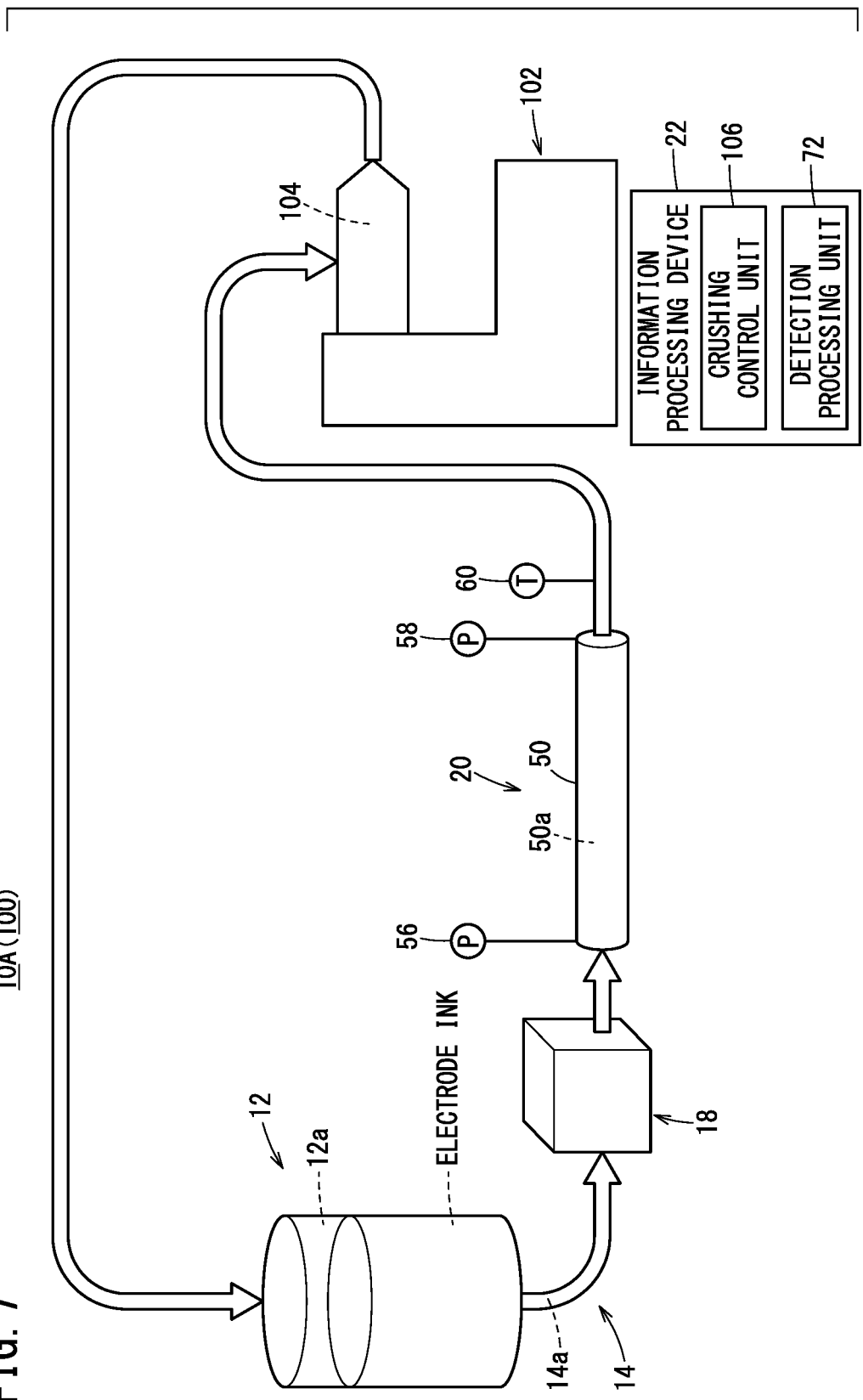
FIG. 7 is an explanatory diagram schematically showing an overall configuration of a viscosity measuring system according to a second embodiment.
Figure 8:
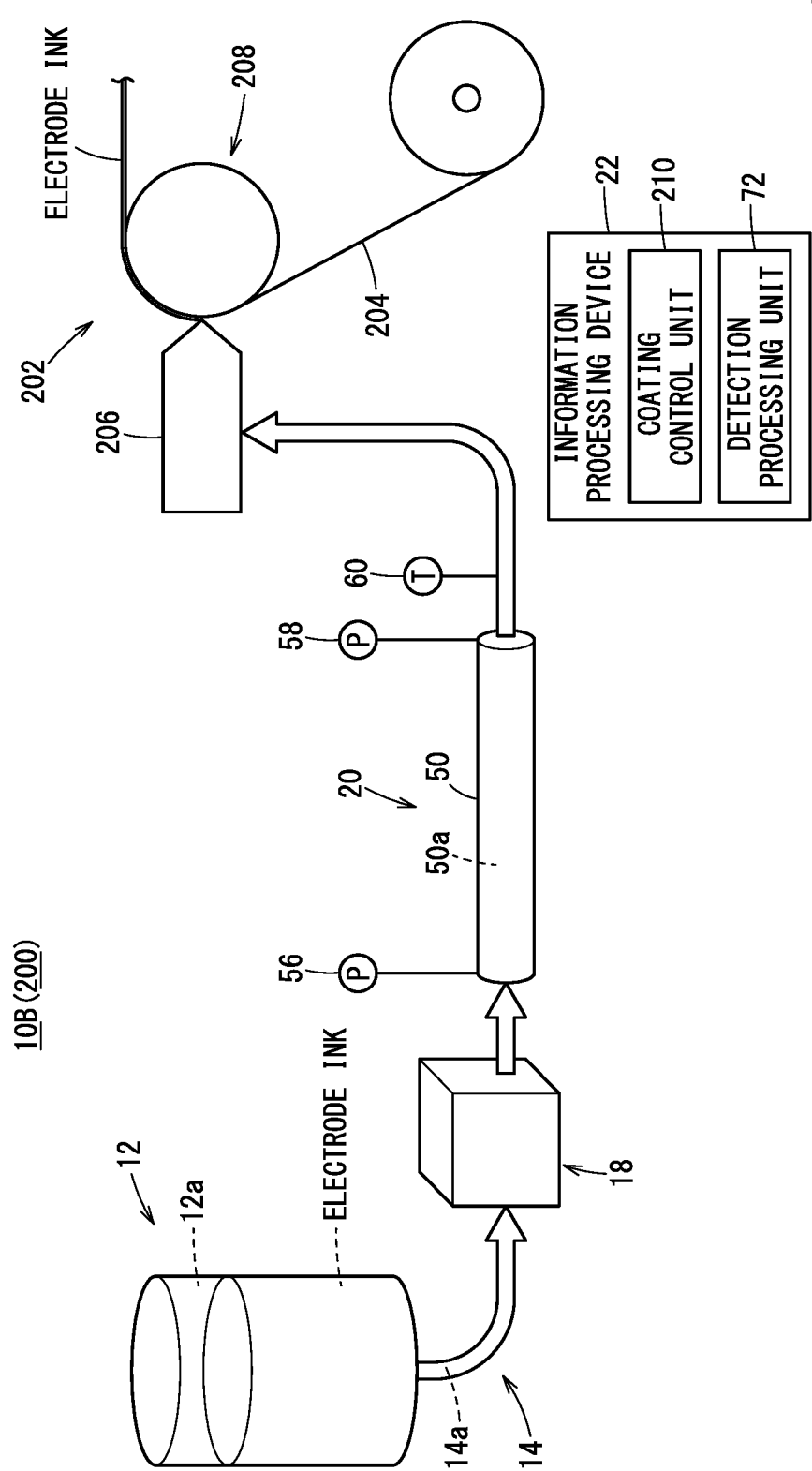
FIG. 8 is an explanatory diagram schematically showing an overall configuration of a viscosity measuring system according to a third embodiment.

The external force applying unit 16 is a device that applies to the electrode ink an external force that is substantially the same as the external force received in the aforementioned kneading process (refer also to FIG. 7) or the coating process (refer also to FIG. 8). As the external force received in the kneading process or the coating process, a shearing force and heat are offered as examples. By appropriately adjusting the external force applying unit 16 prior to the simulation, the same shearing force and heat as the shearing force and heat used in the entire process including the pipes 28 and a crushing unit 102 (refer to FIG. 7), etc., in the kneading process can be applied to the electrode ink. By appropriately adjusting the external force applying unit 16 prior to the simulation, the same shearing force and heat as the shearing force and heat used in the entire process including the pipes 28 and a coating unit 202 (refer to FIG. 8), etc., in the coating process can be applied to the electrode ink. However, with respect to the external forces applied to the electrode ink in the kneading process and the coating process, the external forces applied to the electrode ink in the external force applying unit 16 are set to values obtained by subtracting the external forces applied to the electrode ink in the flow pathway 14 and the pump 18 of the viscosity measuring system 10.

Figure 2A:
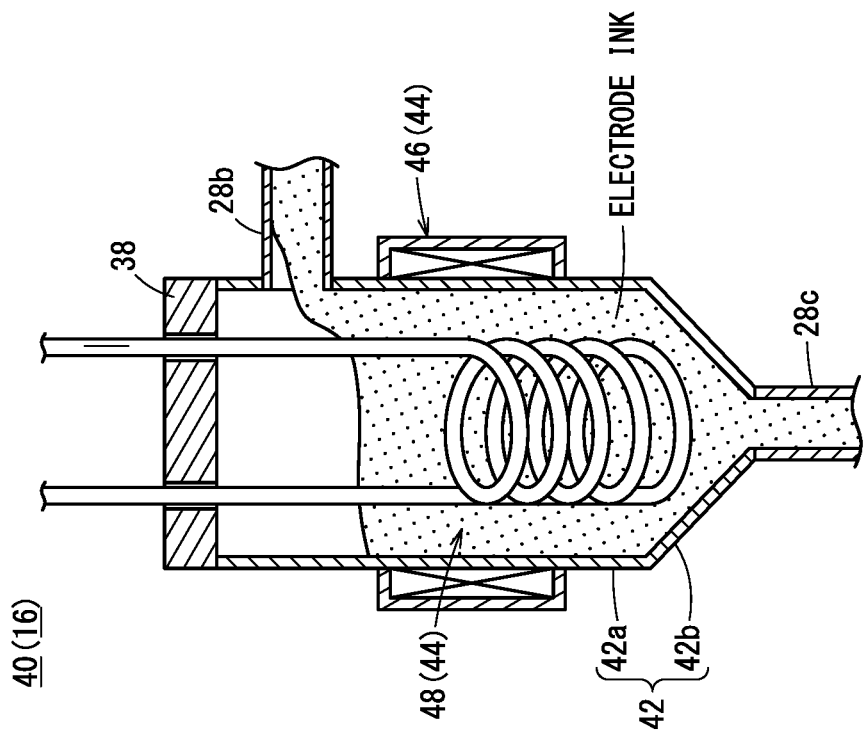
FIG. 2A is a cross-sectional view showing a shearing force adjustment mechanism of an external force applying unit.
Figure 2B:
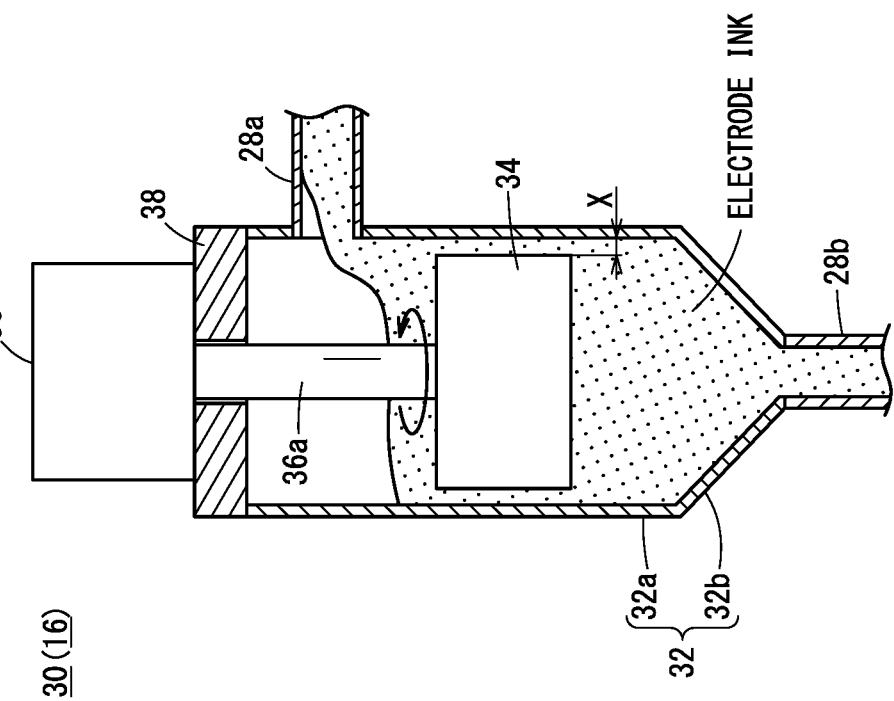
FIG. 2B is a cross-sectional view showing a temperature adjusting mechanism of the external force applying unit.

More specifically, as shown in FIGS. 2A and 2B, the external force applying unit 16 includes a shearing force adjustment mechanism 30 (shearing force applying unit) and a temperature adjustment mechanism 40 (temperature adjustment unit) disposed sequentially in this order toward the downstream side in the flow direction of the electrode ink. Moreover, in the external force applying unit 16, the temperature adjustment mechanism 40 may be arranged on a more upstream side than the shearing force adjustment mechanism 30. The external force applying unit 16 may be provided with a configuration in which the shearing force adjustment mechanism 30 and the temperature adjustment mechanism 40 are integrated.

The shearing force adjustment mechanism 30 includes a container 32 in which the electrode ink is capable of being temporarily stored, a rotating body 34 arranged inside the container 32, and a rotating mechanism 36 for causing the rotating body 34 to rotate.

The container 32 is formed in a tubular shape in which a cylindrical body portion 32a and a conical lower portion 32b are connected to each other. A pipe 28a connected between the tank 12 and the external force applying unit 16 is connected to a side surface of the cylindrical body portion 32a in close proximity to an upper end of the cylindrical body portion 32a. A pipe 28b connected between the shearing force adjustment mechanism 30 and the temperature adjustment mechanism 40 is connected to a center portion on a lower end of the conical lower portion 32b. More specifically, the electrode ink that has flowed out from the tank 12 flows from the pipe 28a into an upper portion of the container 32. The electrode ink flows downward inside the container 32, and flows out from the lower end of the conical lower portion 32b.

The rotating body 34 is formed in a disk-like shape or a columnar shape having a predetermined axial length. A shaft member 36a that extends from the rotating mechanism 36 is connected to a central portion of the rotating body 34. In a state of being installed in the container 32, the rotating body 34 is arranged further downward in a vertical direction inside the cylindrical body portion 32a than the connected location of the pipe 28a. A predetermined gap X is formed between the outer circumferential surface of the rotating body 34 and the inner circumferential surface of the container 32. The rotating body 34 is rotated relatively with respect to the container 32 by the rotating mechanism 36, and thereby applies the shearing force to the downwardly flowing electrode ink between the outer circumferential surface of the rotating body 34 and the inner circumferential surface of the container 32. In the shearing force adjustment mechanism 30, a plurality of types of rotating bodies 34 having different outer diameters from each other can be mounted on the shaft member 36a. The gap X between the rotating body 34 and the container 32 can be adjusted by selecting a rotating body 34 corresponding to the desired gap X, and mounting the rotating body 34 on the shaft member 36a.

The rotating mechanism 36 is installed at an upper end of the container 32 (the cylindrical body portion 32a), and retains the rotating body 34 in a manner so that the rotating body 34 is suspended. The rotating mechanism 36 includes an attachment 38 that is capable of being attached to the container 32, a non-illustrated motor, and a non-illustrated driving force transmission unit disposed between the motor and the shaft member 36a. The rotating mechanism 36 is electrically connected to the information processing device 22 of the viscosity measuring system 10. The rotational speed of the motor of the rotating mechanism 36 is controlled by means of a power adjustment made by the information processing device 22. Consequently, the rotating mechanism 36 causes the shaft member 36a and the rotating body 34 to rotate at a rotational speed set by the information processing device 22.

The temperature adjustment mechanism 40 includes a container 42 capable of temporarily storing the electrode ink, and a heater 44 for heating the electrode ink that has flowed into the container 42. Similar to the shearing force adjustment mechanism 30, the container 42 is formed in a tubular shape in which a cylindrical body portion 42a and a conical lower portion 42b are connected to each other. The pipe 28b is connected to an upper portion of the container 42. A pipe 28c that is connected to the pump 18 is connected to a lower portion of the container 42.

Various structures that are capable of being heated under the control of the information processing device 22 can be applied to the heater 44. More specifically, the heater 44 includes a temperature raising heater 46 installed on the outer circumferential surface of the cylindrical body portion 42a, and a heat retaining heater 48 inserted inside the container 42. The temperature raising heater 46 is used in order to heat the temperature of the electrode ink. The heat retaining heater 48 is used in order to maintain the temperature of the heated electrode ink. For example, at a time when the external force applying unit 16 is operating, the temperature of the temperature raising heater 46 is set on the order of five to ten times higher than the temperature of the heat retaining heater 48.

For the temperature raising heater 46, there can be applied a cylindrical band heater that covers the outer circumferential surface of the container 42 over the entire circumferential direction thereof. An upper end of the temperature raising heater 46 is provided at a position slightly above the upper end of the heat retaining heater 48. A lower portion of the temperature raising heater 46 and the upper portion of the heat retaining heater 48 are arranged at positions where they overlap each other in the vertical direction. As the heat retaining heater 48, for example, there can be applied a spiral shaped heating wire (sheath heater). The temperature adjustment mechanism 40 may include not only the heater 44, but also a cooling member (a coolant flow path, a radiator, or the like) for cooling the electrode ink.

Returning to FIG. 1, the pump 18 includes a mechanism that is capable of controlling the flow rate or the flow velocity of the electrode ink flowing through the flow pathway 14. For example, in order to cause a highly viscous electrode ink to flow, a uniaxial eccentric screw pump can be applied as the pump 18. Such a uniaxial eccentric screw pump includes, for example, a twisted rotor (not shown) that is rotated by a motor (not shown), and a stator (not shown) in which the rotor is accommodated. In this case, in the pump 18, accompanying rotation of the rotor, an eccentric cavity is formed between the rotor and the stator. The pump 18, while generating a suction force for drawing in the electrode ink, causes the electrode ink to flow from an inlet toward an outlet of the cavity.

The state detection unit 20 is arranged on a downstream side of the external force applying unit 16. The state detection unit 20 detects (measures) parameters used for calculating the viscosity of the electrode ink to which an appropriate external force has been applied by the external force applying unit 16. As parameters for calculating the viscosity of the electrode ink, the loss in pressure and the temperature of the electrode ink during flowing thereof are offered as examples. For this purpose, the state detection unit 20 is configured to acquire the temperature and the two pressures which are related to the electrode ink during flowing thereof.

As shown in FIG. 3, the state detection unit 20 is equipped with a measurement pipe 50, an inlet side supporting body 52 that supports an inlet side of the measurement pipe 50, and an outlet side supporting body 54 that supports an outlet side of the measurement pipe 50. The state detection unit 20 is further equipped with a first pressure detection unit 56 provided in the inlet side supporting body 52, a second pressure detection unit 58 provided in the outlet side supporting body 54, and a temperature detection unit 60 provided in the outlet side supporting body 54. The measurement pipe 50, the inlet side supporting body 52, and the outlet side supporting body 54 constitute a portion of the flow pathway 14. A flow path 50a (the flow path 14a of the flow pathway 14) through which the electrode ink flows is disposed in the interior of the measurement pipe 50.

The measurement pipe 50 is formed in a straight line shape, and is supported by the inlet side supporting body 52 and the outlet side supporting body 54 so as to extend in a horizontal direction. One end of the measurement pipe 50 is fixed inside the inlet side supporting body 52. One end of the flow path 50a communicates with a flow path 52a inside the inlet side supporting body 52. Another end of the measurement pipe 50 is fixed inside the outlet side supporting body 54. Another end of the flow path 50a communicates with a flow path 54a inside the outlet side supporting body 54.

The measurement pipe 50 is formed in a cylindrical shape that is thinner than the pipes 28 constituting portions of the flow pathway 14 other than the state detection unit 20. More specifically, the inner diameter of the measurement pipe 50 is set to be smaller than the inner diameter of the portions of the flow pathway 14 other than the state detection unit 20. The inner diameter of the measurement pipe 50 is preferably set to an appropriate value in a manner so that an excessive external force is not applied with respect to the electrode ink. Further, the inner surface of the measurement pipe 50 constituting the flow path 50a is coated with a coating that reduces frictional resistance of the electrode ink insofar as possible, and further suppresses electrical affects due to friction. Consequently, the measurement pipe 50 enables the electrode ink flowing inside the measurement pipe 50 to flow in a laminar flow.

The inlet side supporting body 52 is fixed to a pedestal 62 of the state detection unit 20. A pipe 28d connected to the pump 18 is connected to a lower end of the inlet side supporting body 52. An upper side surface of the inlet side supporting body 52 retains the measurement pipe 50. The flow path 52a is formed so as to extend in the vertical direction in the interior of the inlet side supporting body 52.

The inlet side supporting body 52 is equipped with a space 52b used for detecting the pressure at an intermediate position of the flow path 52a (in close proximity to the measurement pipe 50). The first pressure detection unit 56 is installed in the space 52b. The first pressure detection unit 56 is a pressure sensor that is capable of detecting the internal pressure in the space 52b of the inlet side supporting body 52. The first pressure detection unit 56 periodically detects the pressure of the electrode ink, and transmits the detected pressure (first pressure information) to the information processing device 22. It should be noted that the first pressure detection unit 56 may be disposed in one end (the inlet) of the measurement pipe 50.

The outlet side supporting body 54 is fixed to the pedestal 62 of the state detection unit 20. A pipe 28e connected to the tank 12 is connected to an upper end of the outlet side supporting body 54. A lower side surface of the outlet side supporting body 54 retains the measurement pipe 50. The flow path 54a for the electrode ink is formed so as to extend in the vertical direction in the interior of the outlet side supporting body 54.

The state detection unit 20 is equipped with a space 54b used for detecting the pressure at an intermediate position of the flow path 54a (in close proximity to the measurement pipe 50). The second pressure detection unit 58 is installed in the space 54b. The second pressure detection unit 58 is a pressure sensor that is capable of detecting the internal pressure in the space 54b of the outlet side supporting body 54. The second pressure detection unit 58 periodically detects the pressure of the electrode ink, and transmits the detected pressure (second pressure information) to the information processing device 22. It should be noted that the second pressure detection unit 58 may be disposed in another end (the outlet) of the measurement pipe 50.

The temperature detection unit 60 of the state detection unit 20 is disposed at an upper end part of the outlet side supporting body 54. The upper end part of the outlet side supporting body 54 is a connector 55 to which the pipe 28e that is connected to the tank 12 is connected. The temperature detection unit 60 periodically detects the temperature of the electrode ink flowing through the flow path 14a, and transmits the detected temperature (temperature information) to the information processing device 22. It should be noted that the installed position of the temperature detection unit 60 is not particularly limited. The temperature detection unit 60 may be provided, for example, to the measurement pipe 50 or the inlet side supporting body 52. The temperature detection unit 60 may be disposed at a portion within the flow pathway 14 other than the location of the state detection unit 20, on a more downstream side than the external force applying unit 16.

The state detection unit 20 preferably is equipped with a vent portion (not shown) through which gas from the flow path 14a of the flow pathway 14 is discharged, in order to prevent a change in the internal pressure from occurring due to chemical changes in the electrode ink. For example, the vent portion may be provided at an upper end part of the inlet side supporting body 52, or at an upper end part of the outlet side supporting body 54.

The state detection unit 20 may be provided in the interior of the state detection unit 20 with an ECU (not shown) in which there are included a processor, a memory, and an input/output interface. The ECU can be configured in a manner so as to calculate the loss in pressure (or the viscosity) based on the pressure of the first pressure detection unit 56 and the pressure of the second pressure detection unit 58, and to transmit the calculated loss in pressure (or the viscosity) to the information processing device 22.

As shown in FIG. 1, the viscosity measuring system 10 causes the electrode ink to circulate in a closed flow pathway 14. The entire viscosity measuring system 10 is arranged inside a temperature adjustable chamber (thermostatic chamber). Consequently, apart from the external force applying unit 16, the viscosity measuring system 10 eliminates elements that cause the temperature of the electrode ink to change. The viscosity measuring system 10 may be equipped with a heat retaining mechanism (not shown) within the flow pathway 14 or the like in order to maintain the temperature of the electrode ink uniform. As the heat retaining mechanism, there may be applied a temperature controller disposed around the periphery of the flow pathway 14, or an air conditioner or the like provided inside the chamber.

The information processing device 22 of the viscosity measuring system 10 includes at least one processor, a memory, an input/output interface, and an electronic circuit (none of which are shown). By the at least one processor executing non-illustrated programs stored in the memory, a plurality of functional blocks for controlling each of the constituent components of the viscosity measuring system 10 are formed inside the information processing device 22. Moreover, at least a portion of each of the functional blocks may be constituted by an integrated circuit such as an ASIC (Application Specific Integrated Circuit) and an FPGA (Field Programmable Gate Array), or an electronic circuit containing a discrete device. The memory may be attached to a processor or an integrated circuit or the like.

More specifically, as functional blocks, the information processing device 22 is formed in the interior thereof with a system control unit 70 that controls operations of the viscosity measuring system 10, and a detection processing unit 72 that stores and processes the detection results of the state detection unit 20.

For example, the system control unit 70 controls operations of the pump 18, and thereby draws in the electrode ink from the tank 12 into the pump 18. The system control unit 70 controls operations of the pump 18, and thereby delivers the electrode ink from the pump 18 to the state detection unit 20 and the tank 12. More specifically, the system control unit 70 causes the electrode ink in the tank 12 to circulate through the flow pathway 14 at an appropriate flow velocity or flow rate. The system control unit 70 controls operations of the external force applying unit 16, and thereby applies appropriate external forces (the shearing force and heat) to the electrode ink flowing into the external force applying unit 16, and causes the electrode ink to which the external forces have been applied to flow to the downstream side.

Figure 4:
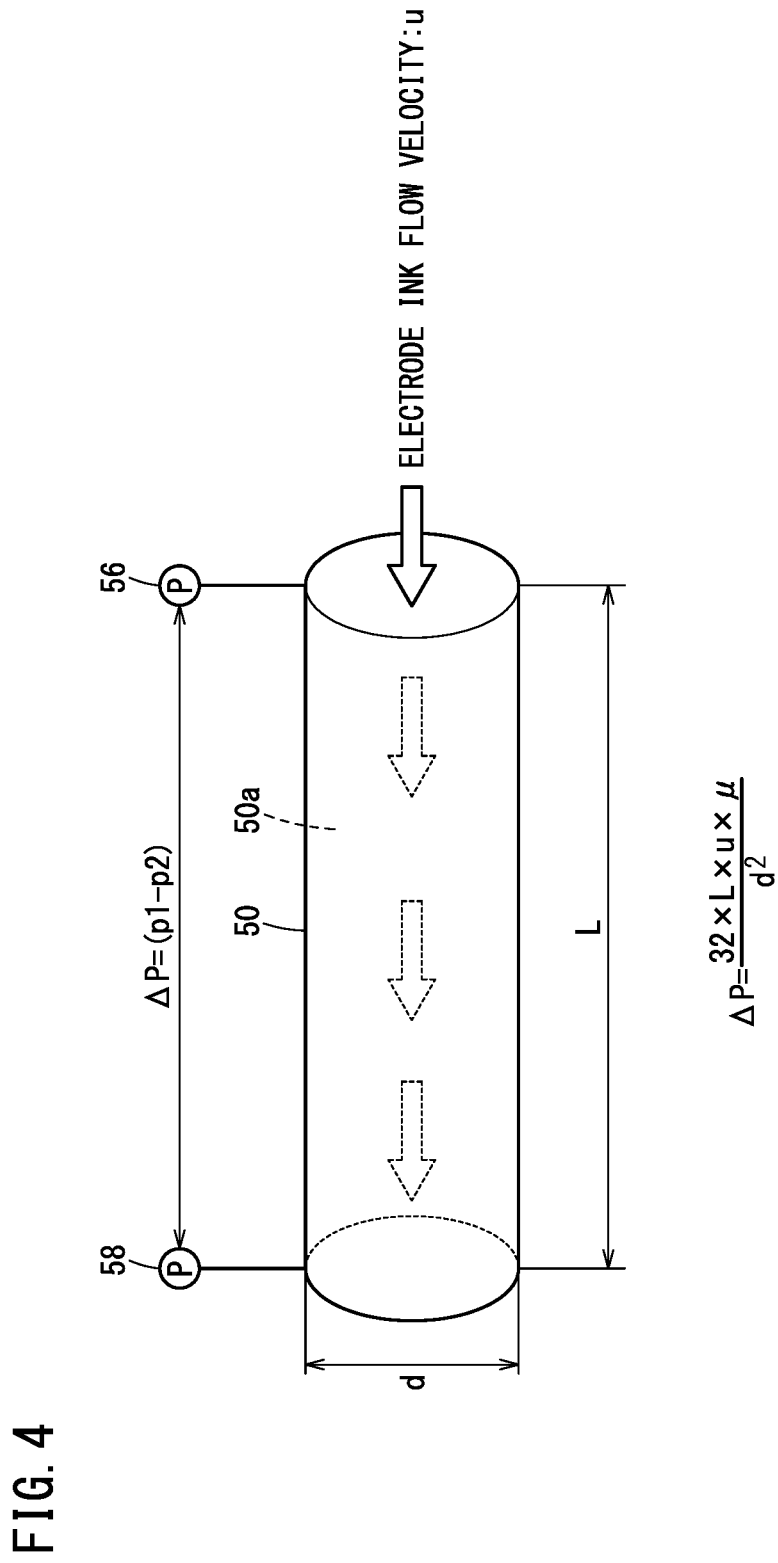
FIG. 4 is an explanatory diagram illustrating a principle of measuring the viscosity of an electrode ink on the basis of a loss in pressure.

The detection processing unit 72 calculates the viscosity of the electrode ink based on the temperature and the two pressures of the electrode ink. Hereinafter, a description will be given with reference to FIG. 4 concerning a principle of calculating the viscosity from the two pressures.

In the case that the length of the measurement pipe 50 is represented by L, the inner diameter (diameter) of the measurement pipe 50 is represented by d, the flow velocity of the fluid is represented by u, and the viscosity of the fluid is represented by $\mu$, a loss in pressure $\Delta P$ of the fluid flowing through the cylindrical measurement pipe 50 can be expressed by the following equation (1). The detection processing unit 72 can acquire the flow velocity u of the electrode ink from the system control unit 70, at a time when the pump 18 is controlled by the system control unit 70. The flow velocity u of the electrode ink is represented by the quotient (flow rate of electrode ink)/(cross-sectional area of the measurement pipe 50). Therefore, the detection processing unit 72 may acquire the flow rate of the electrode ink.

$$\Delta P = (32 \times L \times u \times \mu)/d^2 \tag{1}$$

The loss in pressure $\Delta P$ of the electrode ink flowing through the flow pathway 14 of the viscosity measuring system 10 can be calculated using the actual pressures detected by the state detection unit 20. More specifically, as shown in the following equation (2), the loss in pressure $\Delta P$ of the electrode ink is calculated by subtracting a second pressure value p2 (second pressure information) on the side of the outlet from a first pressure value p1 (first pressure information) on the side of the inlet.

$$\Delta P = p1 - p2 \tag{2}$$

Accordingly, based on the above-described equations (1) and (2), the viscosity $\mu$ of the electrode ink flowing through the flow pathway 14 can be expressed by the following equation (3). In equation (3), the length L of the measurement pipe 50 and the inner diameter d of the measurement pipe 50 are stipulated in advance. The flow rate u of the electrode ink is maintained at a constant rate by the pump 18. Therefore, when $d^2/32 \times L \times u$ is replaced by a proportionality coefficient K, the following equation (4) results.

$$\mu = ((p1-p2) \times d^2)/(32 \times L \times u) \tag{3}$$

$$\mu = K \times (p1-p2) \tag{4}$$

Stated otherwise, the viscosity $\mu$ of the electrode ink is proportional to the loss in pressure $\Delta P$. The larger the loss in pressure $\Delta P$ becomes, the larger the viscosity $\mu$. Accordingly, as a parameter for recognizing the state of the electrode ink, the viscosity measuring system 10 may use the loss in pressure $\Delta P$ calculated from the first and second pressure information as an alternative value for the viscosity $\mu$.

The viscosity $\mu$ of the electrode ink can be calculated by using the following equation (5), which is a Reynolds equation, based on the temperature of the electrode ink detected by the temperature detection unit 60 of the state detection unit 20.

$$\mu = \mu_0 \exp(-bT) \tag{5}$$

(where, $\mu_0$: viscosity at the standard temperature, b: coefficient, T: absolute temperature)

By using the first and second pressure information and the above-described equation (4), the state detection unit 20 periodically calculates the viscosity $\mu$ (hereinafter referred to as a pressure based viscosity) of the electrode ink, and continues to store the calculated pressure based viscosity in the memory. By using the temperature information and the above-described equation (5) together with the pressure based viscosity, the state detection unit 20 periodically calculates the viscosity $\mu$ of the electrode ink (hereinafter referred to as a temperature based viscosity), and continues to store the calculated temperature based viscosity in the memory.

Consequently, using both the pressure based viscosity and the temperature based viscosity, it becomes possible for the viscosity measuring system 10 to analyze changes in the electrode ink. For example, the user extracts the pressure and the temperature of the electrode ink prior to initiating the kneading process, the pressure and the temperature of the electrode ink at predetermined time intervals during the kneading process, and the pressure and the temperature of the electrode ink after completion of the kneading process, and based thereon, the viscosity $\mu$ is measured by the viscosity measuring system 10. Consequently, the user can recognize changes in the viscosity $\mu$ of the electrode ink in the kneading process. Similarly, the user extracts the pressure and the temperature of the electrode ink at predetermined time intervals during the coating process, and based thereon, the viscosity $\mu$ is measured by the viscosity measuring system 10. Consequently, the user can recognize changes in the viscosity $\mu$ of the electrode ink in the coating process.

Hereinafter, a description will be given concerning operations of the viscosity measuring system 10 according to the present embodiment.

Figure 5:
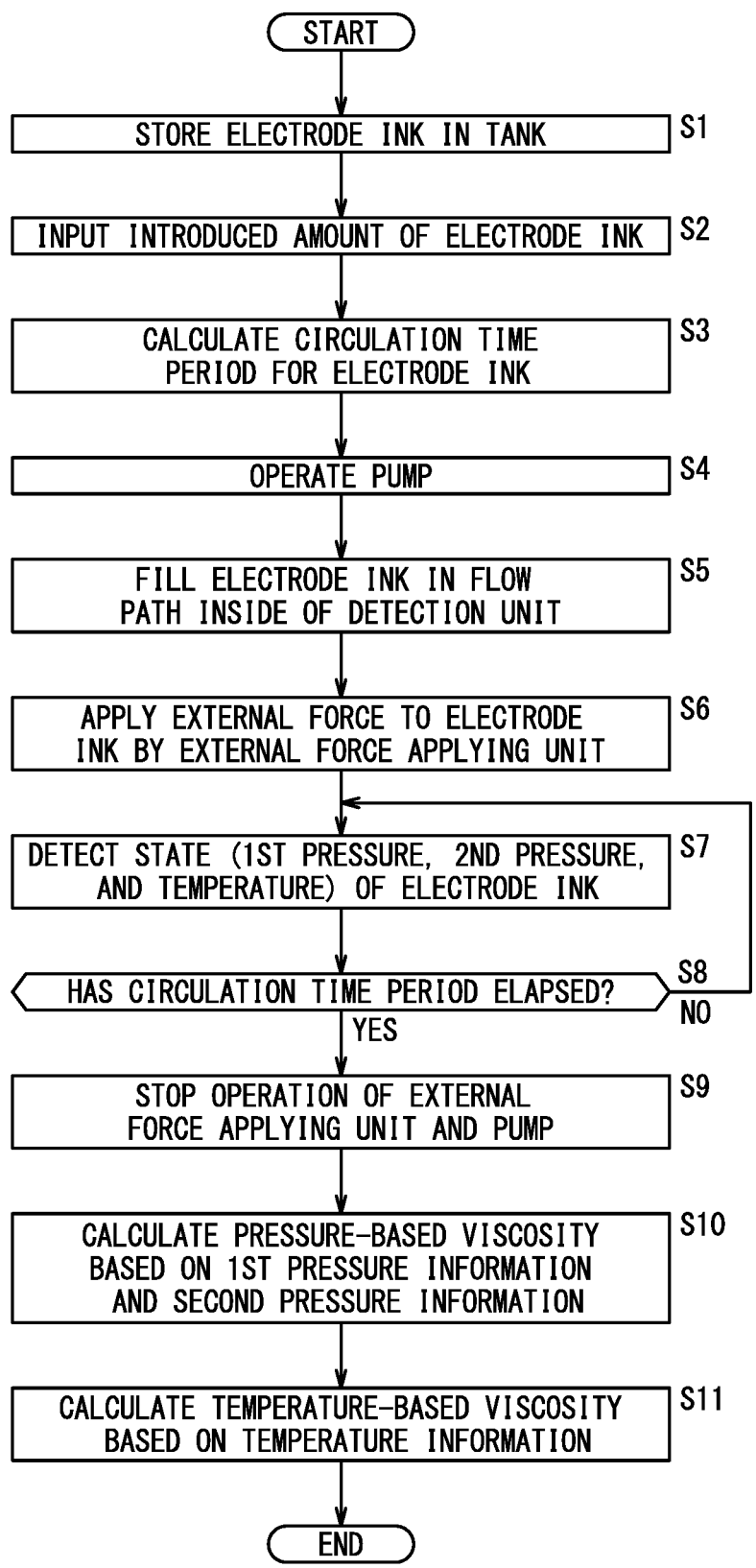
FIG. 5 is a flowchart showing a viscosity measuring method used by the viscosity measuring system shown in FIG. 1.

The viscosity measuring system 10 measures the viscosity $\mu$ of the electrode ink in accordance with the viscosity measuring method shown in FIG. 5. More specifically, the user stores (introduces) the electrode ink to be measured into the tank 12 of the viscosity measuring system 10 (step S1). Thereafter, the user activates the viscosity measuring system 10, and inputs to the information processing device 22 an introduced amount of the electrode ink, and an external force of the process being simulated (step S2). Based on the introduced amount of the electrode ink that was input, the system control unit 70 calculates a circulation time period for the electrode ink (step S3). The circulation time period for the electrode ink includes a time period during which the external force is applied by the external force applying unit 16.

When the aforementioned preparations are completed, the information processing device 22 (the system control unit 70) operates the pump 18 (step S4). Consequently, the electrode ink that is stored in the tank 12 circulates so as to pass through the supply route 24, flow through the external force applying unit 16, the pump 18, and the state detection unit 20, and return again to the tank 12 via the return route 26. Due to such flowing of the electrode ink, a gas such as air or the like escapes from inside the flow path 14a of the flow pathway 14, and the flow path 14a (the flow pathway 50a of the measurement pipe 50) inside the state detection unit 20 is filled with the electrode ink (step S5).

The system control unit 70 initiates operation of the external force applying unit 16, and applies a set external force to the electrode ink flowing through the flow pathway 14 (step S6). The state detection unit 20 periodically detects the state (the first pressure, the second pressure, and the temperature) of the electrode ink to which the external force is applied, and transmits the detection results to the information processing device 22 (step S7). In accordance therewith, the information processing device 22 continues to store in the memory in association with the time the received first pressure information, the second pressure information, and the temperature information.

The information processing device 22 determines whether or not the calculated circulation time period has elapsed (step S8). In the case that the circulation time period has not elapsed (step S8: NO), the process returns to step S7, and detection of the state of the electrode ink is continued. On the other hand, in the case that the circulation time period has elapsed (step S8: YES), the system control unit 70 stops the external force applying unit 16 and the pump 18 (step S9) from being operated. Thereafter, the user, together with discharging the electrode ink from the tank 12 and the flow pathway 14, performs cleaning of the respective constituent components of the viscosity measuring system 10.

The detection processing unit 72 of the viscosity measuring system 10 reads out the first pressure information and the second pressure information for each of the times stored in the memory, calculates the pressure based viscosity for each time, and stores the calculated pressure based viscosity in the memory (step S10). Furthermore, the detection processing unit 72 reads out the temperature information for each of the times stored in the memory, calculates the temperature based viscosity for each time, and stores the calculated temperature based viscosity in the memory (step S11). Consequently, the viscosity measuring system 10 is capable of analyzing changes in the viscosity of the electrode ink when predetermined external forces (external forces simulating the kneading process and the coating process) are applied, and can provide the results of the analysis to the user.

Figure 6:
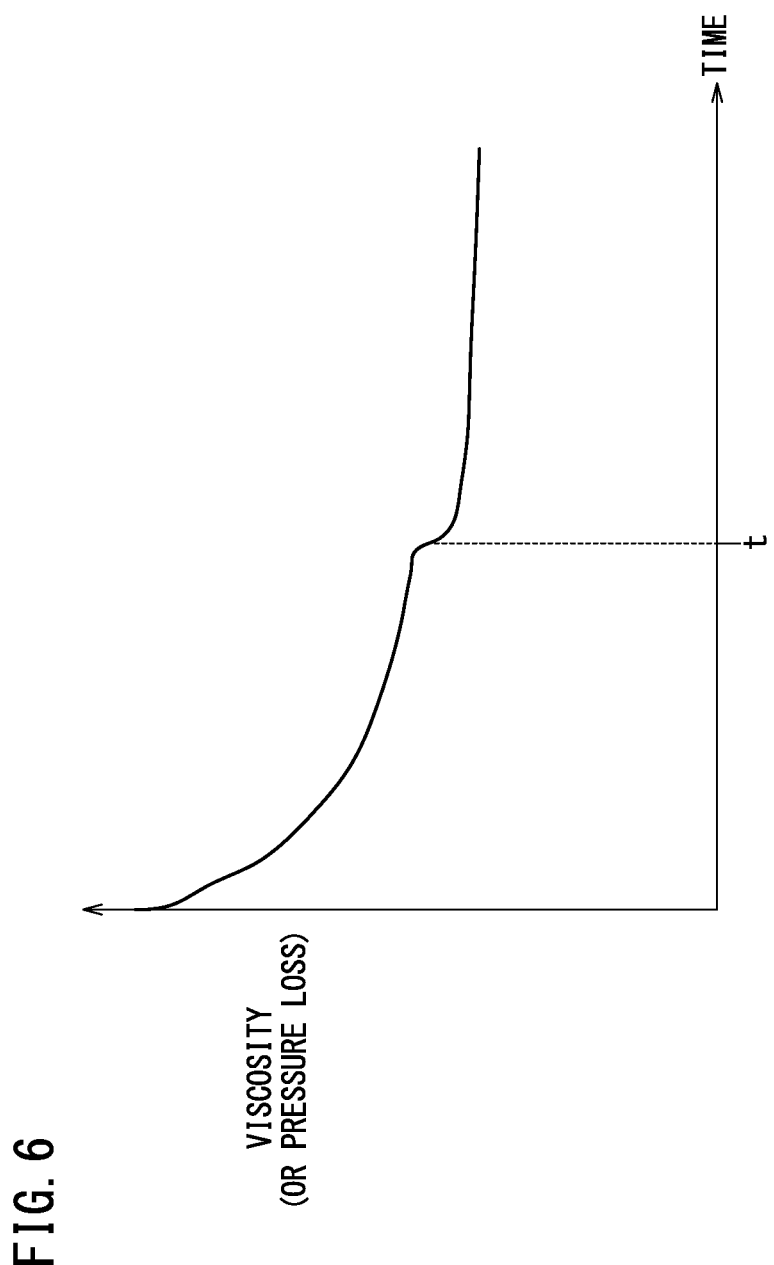
FIG. 6 is a graph illustrating changes over time of the viscosity of the electrode ink when an external force is applied.

For example, from the graph shown in FIG. 6, the user is capable of grasping a change in which the viscosity μ (or the loss in pressure ΔP) of the electrode ink gradually decreases as time elapses. Further, from the graph shown in FIG. 6, the user is capable of grasping a change in which the viscosity μ suddenly decreases at a point in time t, and it is possible to hypothesize a separation phenomenon (ink jab) of the electrode ink. In this manner, while the external force is being applied, in the process simulated by the viscosity measuring system 10, the user is capable of grasping an unexpected or an expected change in the viscosity μ of the electrode ink. As one example thereof, in the case that the viscosity μ of the electrode ink is changed by a predetermined value or greater as time elapses, in such a process, the user is capable of recognizing a need for adjusting the external force (the configuration of the piping or the like).

The present invention is not limited to the above-described embodiment, and various modifications can be made thereto in accordance with the essence and gist of the invention. For example, in the viscosity measuring system 10, the external force applied to the electrode ink in the external force applying unit 16 may be changed during the period that measurement is carried out by the state detection unit 20. Consequently, it is possible to analyze changes in the state of the electrode ink, in the case that the external force is changed due to various factors such as abnormalities or the like in the actual manufacturing process. Similarly, in the viscosity measuring system 10, the flow velocity u of the electrode ink may be changed by causing the rotational speed of the pump 18 to change. In this case, by transmitting the changes in the flow velocity u and the times at which such changes occurred to the detection processing unit 72, the detection processing unit 72 is capable of ensuring the accuracy of the pressure based viscosity of the electrode ink that is calculated.

In the viscosity measuring system 10 shown in FIG. 1, the external force applying unit 16, the pump 18, and the state detection unit 20 are installed sequentially in this order from the upstream side toward the downstream side in the flow direction of the electrode ink. However, the arrangement of the external force applying unit 16, the pump 18, and the state detection unit 20 is not limited to the above-described arrangement. For example, the pump 18, the external force applying unit 16, and the state detection unit 20 may be installed sequentially in this order from the upstream side toward the downstream side in the flow direction of the electrode ink.

The viscosity measuring system 10 may be equipped with a sensor for detecting the flow velocity u or the flow rate of the electrode ink in the state detection unit 20 or at a position in close proximity to the state detection unit 20 (for example, between the pump 18 and the state detection unit 20). In accordance with this feature, the detection processing unit 72 is capable of obtaining the viscosity μ of the electrode ink with higher accuracy, by using the flow velocity u or the flow rate detected in real time by the sensor.

Second Embodiment

As shown in FIG. 7, a viscosity measuring system 10A according to the second embodiment differs from the viscosity measuring system 10 according to the first embodiment, in that measurement of the viscosity μ of the electrode ink is carried out in the actual kneading process. In the following description, constituent elements having the same configuration or the same functions as those in the above-described embodiment are designated by the same reference numerals, and detailed description of such features will be omitted.

More specifically, the manufacturing system 100 (the viscosity measuring system 10A) used in the kneading process includes the tank 12, the flow pathway 14, the pump 18, the crushing unit 102, the state detection unit 20, and the information processing device 22. The tank 12 stores the electrode ink or an electrode material of the electrode ink. The electrode material is a mixture containing the catalyst carrier, the ionomer, and the dispersive solvent. The flow pathway 14 forms a circulation circuit for allowing the electrode ink to circulate with the tank 12 serving as a base point. The pump 18 is disposed in the flow pathway 14, and is configured to be capable of controlling the flow velocity u or the flow rate of the electrode ink.

The crushing unit 102 is disposed in the flow pathway 14 on a more downstream side than the pump 18, and performs crushing, kneading, and stirring of the electrode material of the electrode ink. The crushing unit 102 is one aspect of the external force applying unit in the present invention. The crushing unit 102 according to the present embodiment includes a crushing chamber 104 into which the electrode material flows, and an agitator (not shown) disposed in the crushing chamber 104. The crushing unit 102 is a bead mill that crushes the electrode material by rotating the agitator. The rotational speed of the agitator of the crushing unit 102 (the bead mill) is controlled by the information processing device 22. A kneading time period or a number of times that kneading is performed to knead the electrode material is adjusted by the information processing device 22. The viscosity μ of the electrode ink changes due to the crushing, the kneading, and the stirring of the electrode material in the crushing unit 102. The viscosity μ of the electrode ink may be a low viscosity, or may be a high viscosity. It should be noted that the configuration of the crushing unit 102 is not particularly limited.

The state detection unit 20 is disposed in the flow pathway 14 in a portion between the pump 18 and the crushing unit 102. Since the state detection unit 20 is disposed on the upstream side of the crushing unit 102, it is possible to continuously measure the viscosity μ of the total amount of the electrode ink flowing from the flow pathway 14 into the crushing unit 102. The state detection unit 20 may be configured in the same manner as the state detection unit 20 according to the first embodiment. Stated otherwise, the state detection unit 20 is equipped with the measurement pipe 50, the first pressure detection unit 56 provided in the inlet side of the measurement pipe 50, the second pressure detection unit 58 provided in the outlet side of the measurement pipe 50, and the temperature detection unit 60 provided in the outlet side of the measurement pipe 50. The first pressure detection unit 56 and the second pressure detection unit 58 detect the pressures of the electrode ink flowing through the flow pathway 14, and transmit the detection result to the information processing device 22. The temperature detection unit 60 detects the temperature of the electrode ink flowing through the flow pathway 14, and transmits the detection result to the information processing device 22.

The information processing device 22 includes at least one processor, a memory, an input/output interface, and an electronic circuit. By the at least one processor executing non-illustrated programs stored in the memory, a crushing control unit 106 and the detection processing unit 72 are formed inside the information processing device 22.

The crushing control unit 106 controls operations of the pump 18 and the crushing unit 102 based on settings or the like made by the user. More specifically, the pump 18 which is controlled by the crushing control unit 106 causes the electrode ink to flow at an appropriate flow velocity u or flow rate. Further, the crushing unit 102 which is controlled by the crushing control unit 106 causes the agitator to rotate at an appropriate rotational speed, and carries out crushing, kneading, stirring, and the like of the electrode ink.

Preferably, the crushing control unit 106 automatically controls (feedback controls) the kneading time period or the number of times of kneading of the crushing unit 102 based on the viscosity μ of the electrode ink calculated by the detection processing unit 72. For example, in the case that the calculated viscosity μ of the electrode ink is greater than an upper limit value, the crushing control unit 106 performs a control to reduce the kneading time period or the number of times that kneading is performed. Conversely, in the case that the calculated viscosity μ of the electrode ink is less than a lower limit value, the crushing control unit 106 performs a control to increase the kneading time period or the number of times that kneading is performed.

Based on the detection results (the first pressure information, the second pressure information, and the temperature information) received from the state detection unit 20, the detection processing unit 72 calculates the viscosity μ of the total electrode ink (the electrode material) that flows in the crushing unit 102 in the kneading process, and continues to store the calculated viscosity μ in the memory. Based on the viscosity μ of the electrode ink stored in the memory, the detection processing unit 72 may predict a non-defective product rate (yield) of the electrode ink prepared in the kneading process. For example, concerning the electrode ink to be prepared, the detection processing unit 72 includes map information, in which the kneading time period or the number of times that kneading is performed and the viscosity μ are associated with the non-defective product rate that is obtained by way of simulation or from past results. Consequently, for example, in an open loop control, in the case that the predicted non-defective product ratio has become a desired non-defective product ratio, the information processing device 22 (the crushing control unit 106) is capable of determining the completion of the kneading process.

Third Embodiment

As shown in FIG. 8, a viscosity measuring system 10B according to the third embodiment differs from the viscosity measuring systems 10 and 10A according to the first and second embodiments, in that measurement of the viscosity μ of the electrode ink is carried out in the actual coating process.

More specifically, the manufacturing system 200 (the viscosity measuring system 10B) used in the coating process includes the tank 12, the flow pathway 14, the pump 18, the coating unit 202, the state detection unit 20, and the information processing device 22. The tank 12 stores the electrode ink prepared by the coating process. The flow pathway 14 forms a non-circulation circuit for allowing the electrode ink to flow from the tank 12 to the coating unit 202. The pump 18 is disposed in the flow pathway 14, and is capable of controlling the flow velocity u or the flow rate of the electrode ink.

The coating unit 202 is one aspect of the external force applying unit in the present invention. The coating unit 202 is disposed in the flow pathway 14 on a more downstream side than the pump 18, and coats the electrode ink with respect to a substrate material 204. The coating unit 202 includes a die head 206 for coating the electrode ink, and a transport structure 208 for feeding out the substrate material 204 that is wound in a roll-like shape. The coating unit 202 is a coating machine that ejects the electrode ink from the die head 206 while the substrate material 204 is fed out by the transport structure 208. In the coating unit 202, the information processing device 22 controls the ejection pressure and the amount of the electrode ink ejected from the die head 206, together with controlling the speed at which the substrate material 204 is fed out. It should be noted that the configuration of the coating unit 202 is not particularly limited.

The state detection unit 20 is disposed in the flow pathway 14 in a portion between the pump 18 and the coating unit 202. Since the state detection unit 20 is disposed on the upstream side of the coating unit 202, it is possible to continuously measure the viscosity μ of the total amount of the electrode ink flowing from the flow pathway 14 into the coating unit 202. The first pressure detection unit 56 and the second pressure detection unit 58 of the state detection unit 20 detect the pressures of the electrode ink flowing through the measurement pipe 50, and transmit the detection result to the information processing device 22. The temperature detection unit 60 detects the temperature of the electrode ink flowing through the measurement pipe 50, and transmits the detection result to the information processing device 22.

The information processing device 22 includes at least one processor, a memory, an input/output interface, and an electronic circuit. By the at least one processor executing non-illustrated programs stored in the memory, a coating control unit 210 and the detection processing unit 72 are formed inside the information processing device 22.

The coating control unit 210 controls operations of the pump 18 and the coating unit 202 based on settings or the like made by the user. Consequently, the electrode ink is continuously coated at an appropriate thickness on the substrate material 204. Further, preferably, the coating control unit 210 automatically controls (feedback controls) the coating velocity of the coating unit 202 (the amount of the electrode ink that is ejected, the amount of the substrate material 204 that is fed out) based on the viscosity $\mu$ of the electrode ink calculated by the detection processing unit 72. For example, in the case that the viscosity $\mu$ of the electrode ink is greater than the upper limit value, the coating control unit 210 decreases the coating velocity, whereas in the case that the viscosity $\mu$ of the electrode ink is less than the lower limit value, the coating control unit 210 increases the coating velocity.

The coating control unit 210 may estimate the amount of the electrode ink based on the pressure information (at least one of the first and second pressure information) measured by the state detection unit 20, may issue a prompt for the electrode ink to be replenished, and may adjust the coating performed by the coating unit 202. Consequently, the yield of the electrode ink that is coated on the substrate material 204 can be further enhanced.

Based on the detection results (the first pressure information, the second pressure information, and the temperature information) received from the state detection unit 20, the detection processing unit 72 calculates the viscosity $\mu$ of the total electrode ink (the electrode material) that flows in the crushing unit 102 in the kneading process. The detection processing unit 72 stores the calculated viscosity $\mu$ in the memory. In the coating process, based on the viscosity $\mu$ of the electrode ink stored in the memory, the detection processing unit 72 may predict the yield (the non-defective product rate) of the electrode ink coated on the substrate material 204. Consequently, in an open loop control, in the case that the viscosity $\mu$ of the electrode ink lies within a predetermined range, the information processing device 22 can determine that a desired non-defective product rate is maintained. On the other hand, in the case that the viscosity $\mu$ of the electrode ink lies outside of the predetermined range, the information processing device 22 can determine that a departure from the desired non-defective product rate has occurred.

Technical concepts and advantageous effects which can be grasped from the above-described embodiments will be explained below.

The first aspect of the present invention is characterized by the viscosity measuring system (10, 10A, 10B), comprising the tank (12) in which the electrode ink is stored, the flow pathway (14) connected to the tank and in which the electrode ink is capable of flowing, the external force applying unit (16) disposed in the flow pathway and which applies the external force to the electrode ink, the pump (18) disposed in the flow pathway and which is capable of controlling the flow velocity or the flow rate of the electrode ink, the first pressure detection unit (56) disposed in the flow pathway, and which detects the pressure of the electrode ink flowing through the flow pathway, the second pressure detection unit (58) disposed in a portion in the flow pathway on a more downstream side than the first pressure detection unit, and which detects the pressure of the electrode ink flowing through the flow pathway, and the detection processing unit (72) that calculates the viscosity of the electrode ink based on the pressure detected by the first pressure detection unit and the pressure detected by the second pressure detection unit.

In accordance with the above-described features, in the viscosity measuring system, the pressure of the electrode ink to which the external force is applied is continuously detected by the first pressure detection unit and the second pressure detection unit, which are disposed at different positions in the flow pathway. In the viscosity measuring system, based on the two detected pressures, it is possible to stably measure the viscosity $\mu$ of the total amount of the electrode ink. More specifically, the viscosity measuring system is capable of recognizing a change in the viscosity $\mu$ of the electrode ink accompanying the application of an appropriate external force, without extracting a portion of a sample of the electrode ink, and without stopping the electrode ink from flowing.

The first pressure detection unit is disposed in a portion in the flow pathway on a more downstream side than the external force applying unit, and the external force applying unit includes the shearing force applying unit that applies the shearing force to the electrode ink, and the temperature adjustment unit that heats or cools the electrode ink. In accordance with this feature, the viscosity measuring system is capable of satisfactorily measuring the viscosity $\mu$ of the electrode ink for which the temperature and the shearing force are adjusted by the external force applying unit 16.

The flow pathway includes the cylindrical measurement pipe (50) between the first pressure detection unit and the second pressure detection unit, the measurement pipe is formed to be thinner than portions within the flow pathway other than the measurement pipe, the first pressure detection unit detects the pressure of the electrode ink at the inlet or in close proximity to the inlet of the measurement pipe, and the second pressure detection unit detects the pressure of the electrode ink at the outlet or in close proximity to the outlet of the measurement pipe. In accordance with these features, the viscosity measuring system is capable of detecting the loss in pressure $\Delta P$ generated in the electrode ink in the measurement pipe with higher accuracy, and the measurement accuracy of the viscosity $\mu$ of the electrode ink can be enhanced.

Within the flow pathway, there is provided the temperature detection unit that detects the temperature of the electrode ink flowing through the portion in the flow pathway on a more downstream side than the external force applying unit, and the detection processing unit calculates the viscosity of the electrode ink based on the temperature detected by the temperature detection unit. In accordance with this feature, the viscosity measuring system is capable of measuring the viscosity $\mu$ of the electrode ink from the temperature detected by the temperature detection unit, and the characteristics of the electrode ink can be more easily recognized.

The external force applying unit comprises the crushing unit (102) that crushes the electrode material of the electrode ink, and the first pressure detection unit (56) is disposed in a portion in the flow pathway between the pump and the crushing unit. In accordance with this feature, in the manufacturing process in which the crushing unit is included, the viscosity measuring system is capable of measuring the viscosity µ of the total amount of the electrode ink.

The viscosity measuring system further comprises the crushing control unit that controls the kneading time period or the number of times of kneading of the crushing unit based on the viscosity of the electrode ink calculated by the detection processing unit. In accordance with this feature, when crushing, kneading, or the like is carried out in order to prepare the electrode ink, the viscosity measuring system can significantly increase the yield of the electrode ink.

The external force applying unit comprises the coating unit (202) that coats the substrate material with the electrode ink, and the first pressure detection unit is disposed in a portion in the flow pathway between the pump and the coating unit. In accordance with this feature, in the manufacturing process in which the coating unit is included, the viscosity measuring system is capable of measuring the viscosity µ of the total amount of the electrode ink.

The viscosity measuring system further comprises the coating control unit that controls operations of the coating unit based on the viscosity of the electrode ink calculated by the detection processing unit, the pressure detected by the first pressure detection unit, or the pressure detected by the second pressure detection unit. In accordance with this feature, when the electrode ink is coated, the viscosity measuring system can significantly increase the yield of the electrode ink.

Further, the second aspect of the present invention is characterized by the viscosity measuring method for measuring the viscosity of the electrode ink, comprising the steps of storing the electrode ink in the tank (12), causing the electrode ink to flow through the flow pathway (14) by the pump (18) disposed in the flow pathway and which is connected to the tank, applying the external force to the electrode ink by the external force applying unit (16) disposed in the flow pathway, detecting the pressure of the electrode ink flowing through the flow pathway by the first pressure detection unit (56) disposed in the flow pathway, detecting the pressure of the electrode ink flowing through the flow pathway by the second pressure detection unit (58) disposed in a portion in the flow pathway on a more downstream side than the first pressure detection unit, and calculating the viscosity of the electrode ink based on the pressure detected by the first pressure detection unit and the pressure detected by the second pressure detection unit. In accordance with these features, the viscosity measuring method is capable of satisfactorily measuring the viscosity µ of the electrode ink to which the external force is applied by the external force applying unit.

The first pressure detection unit is disposed in a portion in the flow pathway on a more downstream side than the external force applying unit.

The external force applying unit comprises the crushing unit (102) that crushes the electrode material of the electrode ink, and the first pressure detection unit is disposed in a portion in the flow pathway between the pump and the crushing unit. In accordance with this feature, the viscosity measuring method is capable of satisfactorily measuring the viscosity µ of the electrode ink that is crushed, kneaded, or the like by the crushing unit.

The external force applying unit comprises the coating unit (202) that coats the substrate material (204) with the electrode ink, and the first pressure detection unit is disposed in a portion in the flow pathway between the pump and the coating unit. In accordance with this feature, the viscosity measuring method is capable of satisfactorily measuring the viscosity µ of the electrode ink that is coated by the coating unit.

What is claimed is:

1. A viscosity measuring system, comprising:
   a tank configured to store an electrode ink;
   a flow pathway connected to the tank and in which the electrode ink is capable of flowing;
   an external force applying unit disposed in the flow pathway and configured to apply an external force to the electrode ink;
   a pump disposed in the flow pathway and configured to be capable of controlling a flow velocity or a flow rate of the electrode ink;
   a first pressure detection unit disposed in the flow pathway, and configured to detect a pressure of the electrode ink flowing through the flow pathway;
   a second pressure detection unit disposed in a portion in the flow pathway on a more downstream side than the first pressure detection unit, and configured to detect the pressure of the electrode ink flowing through the flow pathway; and
   a detection processing unit configured to calculate a viscosity of the electrode ink based on the pressure detected by the first pressure detection unit and the pressure detected by the second pressure detection unit, wherein
   the external force applying unit comprises a coating unit configured to coat a substrate material with the electrode ink; and
   the first pressure detection unit is disposed in a portion in the flow pathway between the pump and the coating unit.

2. The viscosity measuring system according to claim 1, wherein:
   the flow pathway comprises a cylindrical measurement pipe between the first pressure detection unit and the second pressure detection unit;
   the measurement pipe is formed to be thinner than portions within the flow pathway other than the measurement pipe;
   the first pressure detection unit detects the pressure of the electrode ink at an inlet or in proximity to an inlet of the measurement pipe; and
   the second pressure detection unit detects the pressure of the electrode ink at an outlet or in proximity to an outlet of the measurement pipe.

3. The viscosity measuring system according to claim 1, further comprising:
   a temperature detection unit configured to detect a temperature of the electrode ink flowing through the portion in the flow pathway on a more downstream side than the external force applying unit; and
   the detection processing unit calculates the viscosity of the electrode ink based on the temperature detected by the temperature detection unit.

4. The viscosity measuring system according to claim 1, further comprising a coating control unit configured to control operations of the coating unit, based on the viscosity of the electrode ink calculated by the detection processing unit, or a loss in pressure calculated from the pressure detected by the first pressure detection unit and the pressure detected by the second pressure detection unit.

* * * * *